United States Patent
Bergström et al.

(10) Patent No.: US 12,386,461 B2
(45) Date of Patent: Aug. 12, 2025

(54) TOUCH-SENSING APPARATUS

(71) Applicant: Flatfrog Laboratories AB, Lund (SE)

(72) Inventors: Håkan Bergström, Torna-Hällestad (SE); Tomas Svensson, Limhamn (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 18/429,192

(22) Filed: Jan. 31, 2024

(65) Prior Publication Data

US 2024/0248565 A1 Jul. 25, 2024

Related U.S. Application Data

(63) Continuation of application No. 17/759,836, filed as application No. PCT/SE2021/050040 on Jan. 25, 2021, now Pat. No. 11,893,189.

(30) Foreign Application Priority Data

Feb. 10, 2020 (SE) .................................... 2030044-8
Nov. 9, 2020 (SE) .................................... 2030335-0

(51) Int. Cl.
G06F 3/042 (2006.01)
(52) U.S. Cl.
CPC .......... G06F 3/0428 (2013.01); G06F 3/0421 (2013.01); *G06F 2203/04103* (2013.01)
(58) Field of Classification Search
CPC ................ G06F 3/0428; G06F 3/0421; G06F 2203/04103
See application file for complete search history.

(56) References Cited

U.S. PATENT DOCUMENTS 3,375,053 A * 3/1968 Ward .................... B60R 1/0605
　　　　　　　　　　　　　　　　　　　　　　　D12/187
4,916,308 A * 4/1990 Meadows ............. G06F 3/0412
　　　　　　　　　　　　　　　　　　　　　　　250/221

(Continued)

FOREIGN PATENT DOCUMENTS

CN　　　　108345414 A　*　7/2018　............. F21V 33/00
KR　　20160075643 A　*　6/2016

(Continued)

OTHER PUBLICATIONS

Machine translation of CN 108345414A (Year: 2018).*
Machine translation of KR20160075643A (Year: 2016).*

*Primary Examiner* — Patrick N Edouard
*Assistant Examiner* — Joseph P Fox
(74) *Attorney, Agent, or Firm* — Knobbe, Martens, Olson, & Bear, LLP

(57) ABSTRACT

A touch sensing apparatus is disclosed comprising a panel having a touch surface, emitters and detectors arranged along a perimeter, a light directing portion arranged adjacent the perimeter and comprising a light directing surface, the emitters and/or the detectors are arranged opposite a rear surface of the panel to emit and/or receive light through a channel in a frame element, the channel is arranged opposite the rear surface and extends in a direction of a normal axis of the touch surface, the light directing surface and the channel are arranged on opposite sides of the panel and overlap in the direction of the plane, the light directing surface receive light from the emitters, or direct light to the detectors, through the panel and through the channel, in the direction of the normal axis. A method of manufacturing a frame element for a touch sensing apparatus is disclosed.

21 Claims, 14 Drawing Sheets

(56) References Cited

U.S. PATENT DOCUMENTS

| | | | |
|---|---|---|---|
| 2008/0198144 A1* | 8/2008 | Shimizu | G06F 3/0421 |
| | | | 345/175 |
| 2012/0176343 A1* | 7/2012 | Holmgren | G06F 3/0421 |
| | | | 345/175 |
| 2018/0263130 A1* | 9/2018 | Curran | G06F 1/1656 |
| 2019/0004668 A1* | 1/2019 | Jeong | G01J 1/0204 |

FOREIGN PATENT DOCUMENTS

| | | | | |
|---|---|---|---|---|
| WO | WO-9527919 A2 * | 10/1995 | | G02B 27/283 |
| WO | WO-2006081633 A1 * | 8/2006 | | G02B 6/122 |

* cited by examiner

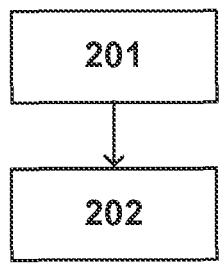
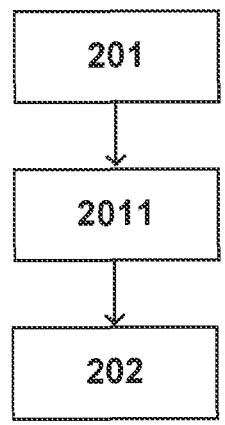
Fig. 10a
Fig. 10b
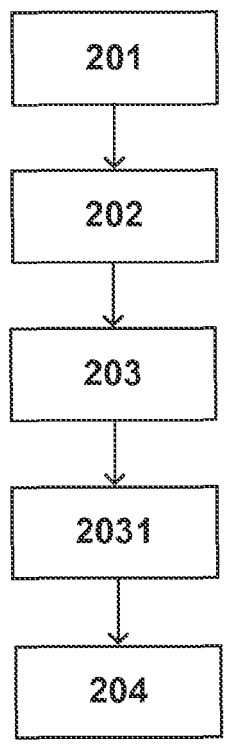
Fig. 10c

TOUCH-SENSING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention pertains to touch-sensing apparatus that operate by propagating light above a panel. More specifically, it pertains to optical and mechanical solutions for controlling and tailoring the light paths above the panel via fully or partially randomized refraction, reflection or scattering.

Description of the Related Art

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. I.E., a grid of intersecting light paths are created above the touch surface, also referred to as scanlines. An object that touches the touch surface will attenuate the light on one or more scanlines of the light and cause a change in the light received by one or more of the detectors. The location (coordinates), shape or area of the object may be determined by analyzing the received light at the detectors.

Optical and mechanical characteristics of the touch-sensitive apparatus affects the scattering of the light between the emitters/detectors and the touch surface, and the accordingly the detected touch signals. For example, the width of the scanlines affects touch performance factors such as detectability, accuracy, resolution, and the presence of reconstruction artefacts. Problems with previous prior art touch detection systems relate to sub-optimal performance with respect to the aforementioned factors. Further, variations in the alignment of the opto-mechanical components affects the detection process which may lead to a sub-optimal touch detection performance. Factors such as signal-to-noise ratio, detection accuracy, resolution, the presence of artefacts etc, in the touch detection process may be affected. While prior art systems aim to improve upon these factors, e.g. the detection accuracy, there is often an associated compromise in terms of having to incorporate more complex and expensive opto-mechanical modifications to the touch system. This typically results in a less compact touch system, and a more complicated manufacturing process, being more expensive.

SUMMARY OF THE INVENTION

An objective is to at least partly overcome one or more of the above identified limitations of the prior art.

One objective is to provide a touch-sensitive apparatus which is compact, less complex, robust and easy to assemble.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect, a touch sensing apparatus is provided comprising a panel that defines a touch surface extending in a plane having a normal axis, a plurality of emitters and detectors arranged along a perimeter of the panel, a light directing portion arranged adjacent the perimeter and comprising a light directing surface, wherein the emitters are arranged to emit light and the light directing surface is arranged to receive the light and direct the light across the touch surface, wherein the panel comprises a rear surface, opposite the touch surface, and the emitters and/or the detectors are arranged opposite the rear surface to emit and/or receive light through a channel in a frame element, the channel is arranged opposite the rear surface and extends in a direction of the normal axis, wherein the light directing surface and the channel are arranged on opposite sides of the panel and overlap in the direction of the plane, whereby the light directing surface receive light from the emitters, or direct light to the detectors, through the panel and through the channel, in the direction of the normal axis.

According to a second aspect, a method of manufacturing a frame element for a touch sensing apparatus is provided, comprising extruding the frame element to form a light directing portion and a cavity adapted to receive a substrate comprising emitters and/or detectors, and milling a wall portion of the cavity to form a channel so that, in use, a light directing surface of the light directing portion receive light from the emitters, or direct light to the detectors, through the channel.

Some examples of the disclosure provide for a more compact touch sensing apparatus.

Some examples of the disclosure provide for a touch sensing apparatus that is less costly to manufacture.

Some examples of the disclosure provide for a touch sensing apparatus with a reduced number of electro-optical components.

Some examples of the disclosure provide for a more robust touch sensing apparatus.

Some examples of the disclosure provide for a touch sensing apparatus that is more reliable to use.

Some examples of the disclosure provide for reducing stray light effects.

Some examples of the disclosure provide for reducing ambient light sensitivity.

Some examples of the disclosure provide for a touch sensing apparatus that has a better signal-to-noise ratio of the detected light.

Some examples of the disclosure provide for a touch-sensing apparatus with improved resolution and detection accuracy of small objects.

Some examples of the disclosure provide for a touch-sensing apparatus with less detection artifacts.

Some examples of the disclosure provide for a touch-sensing apparatus with a more uniform coverage of scanlines across the touch surface.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which;

FIG. 10a is a flow-chart of a method of manufacturing a frame element for a touch sensing apparatus, according to one example of the disclosure; and FIG. 10b is another flow-chart of a method of manufacturing a frame element for a touch sensing apparatus, according to one example of the disclosure, FIG. 10c is another flow-chart of a method of manufacturing a frame element for a touch sensing apparatus, according to one example of the disclosure.

DETAILED DESCRIPTION OF THE PREFERRED EMBODIMENT

Figure 1A:
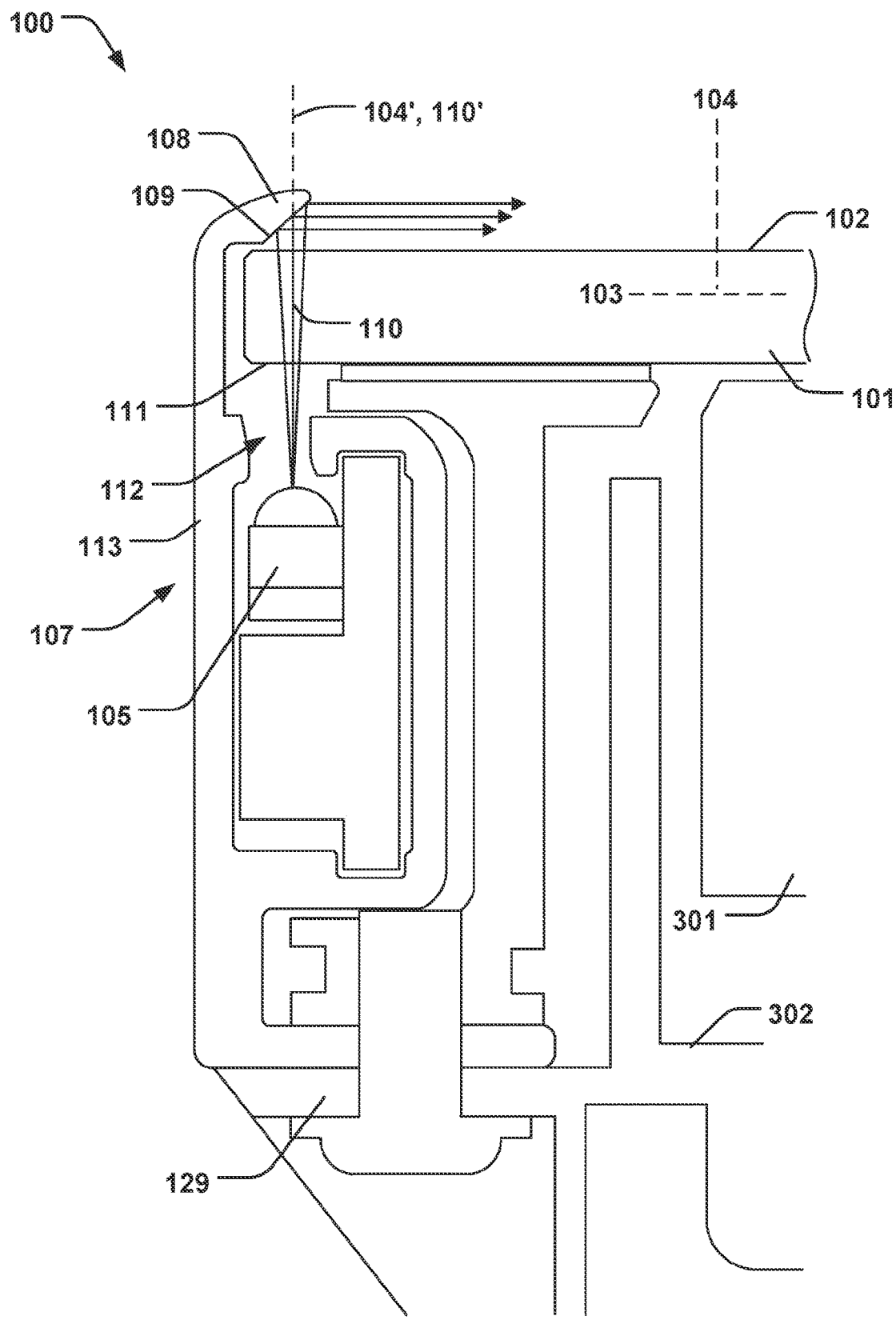
FIG. 1a is a schematic illustration, in a cross-sectional side view, of a touch-sensing apparatus, according to one example of the disclosure.

In the following, embodiments of the present invention will be presented for a specific example of a touch-sensitive apparatus. Throughout the description, the same reference numerals are used to identify corresponding elements.

Figure 1B:
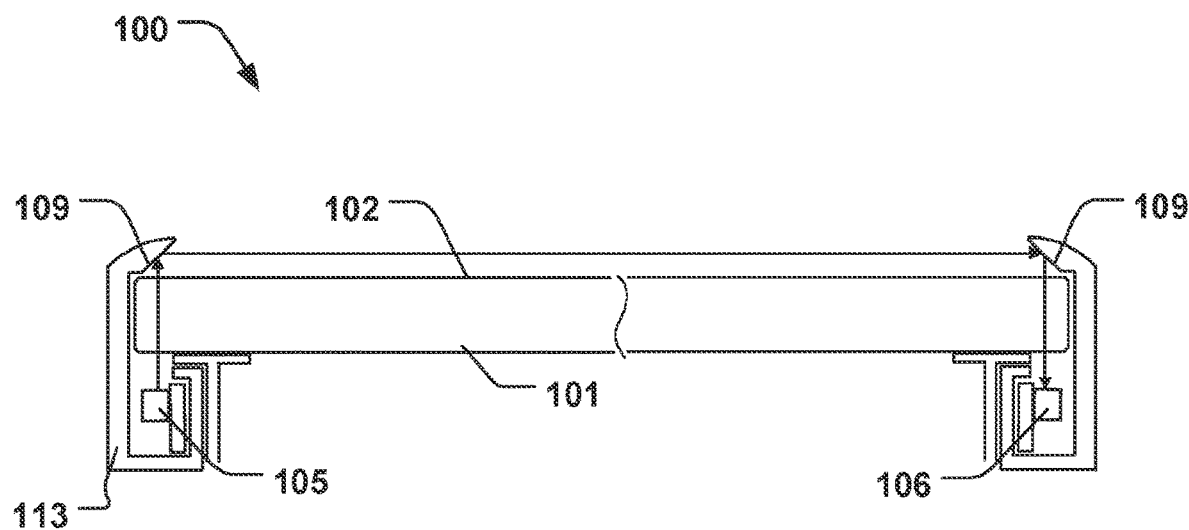
FIG. 1b is a schematic illustration, in a cross-sectional side view, of a touch-sensing apparatus, according to one example of the disclosure.
Figure 1C:
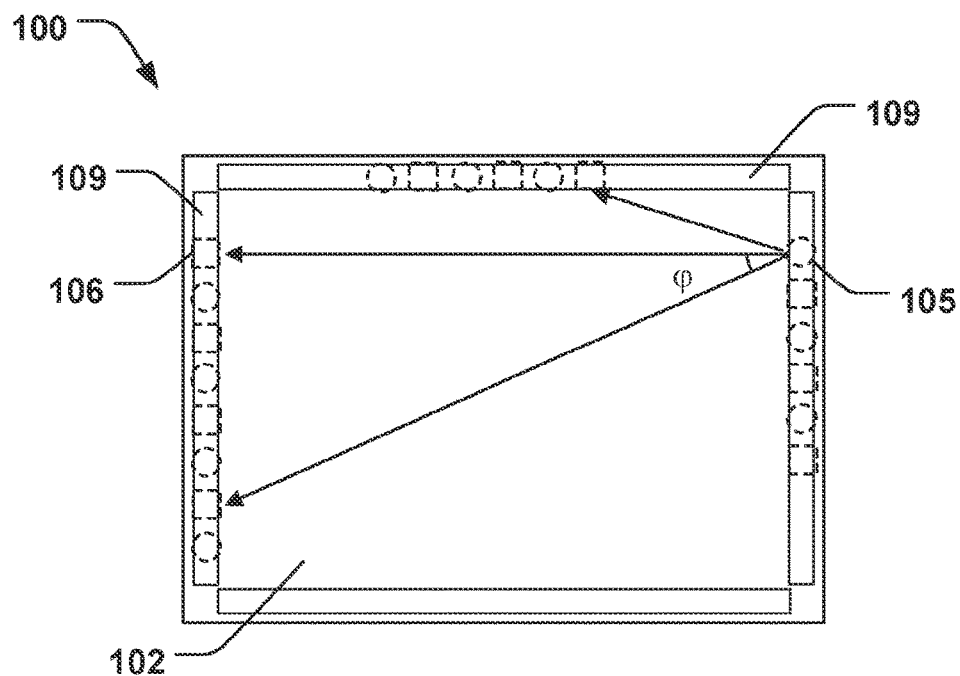
FIG. 1c is a schematic illustration, in a top-down view, of a touch-sensing apparatus, according to one example of the disclosure.
Figure 1D:
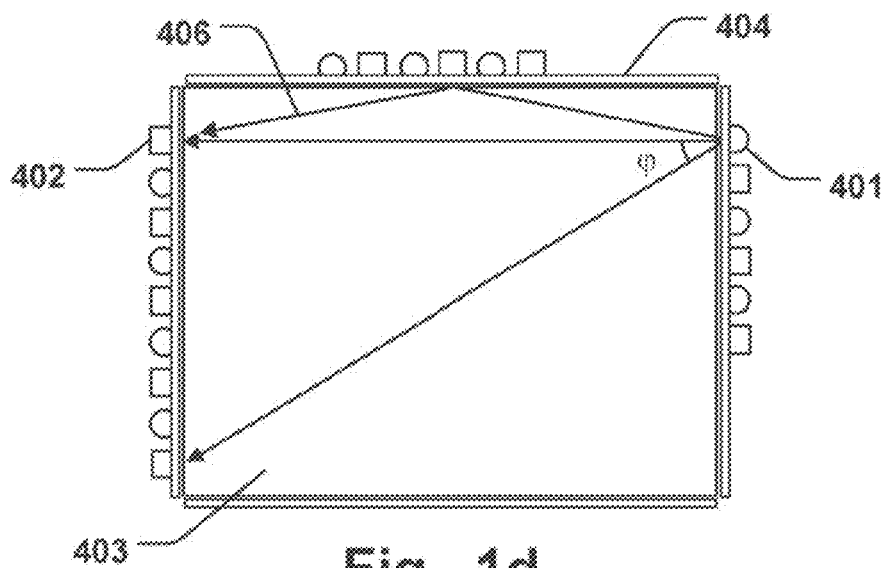
FIGS. 1d-e are schematic illustrations, in top-down views, of an example of a prior art touch-sensing apparatus.
Figure 1E:
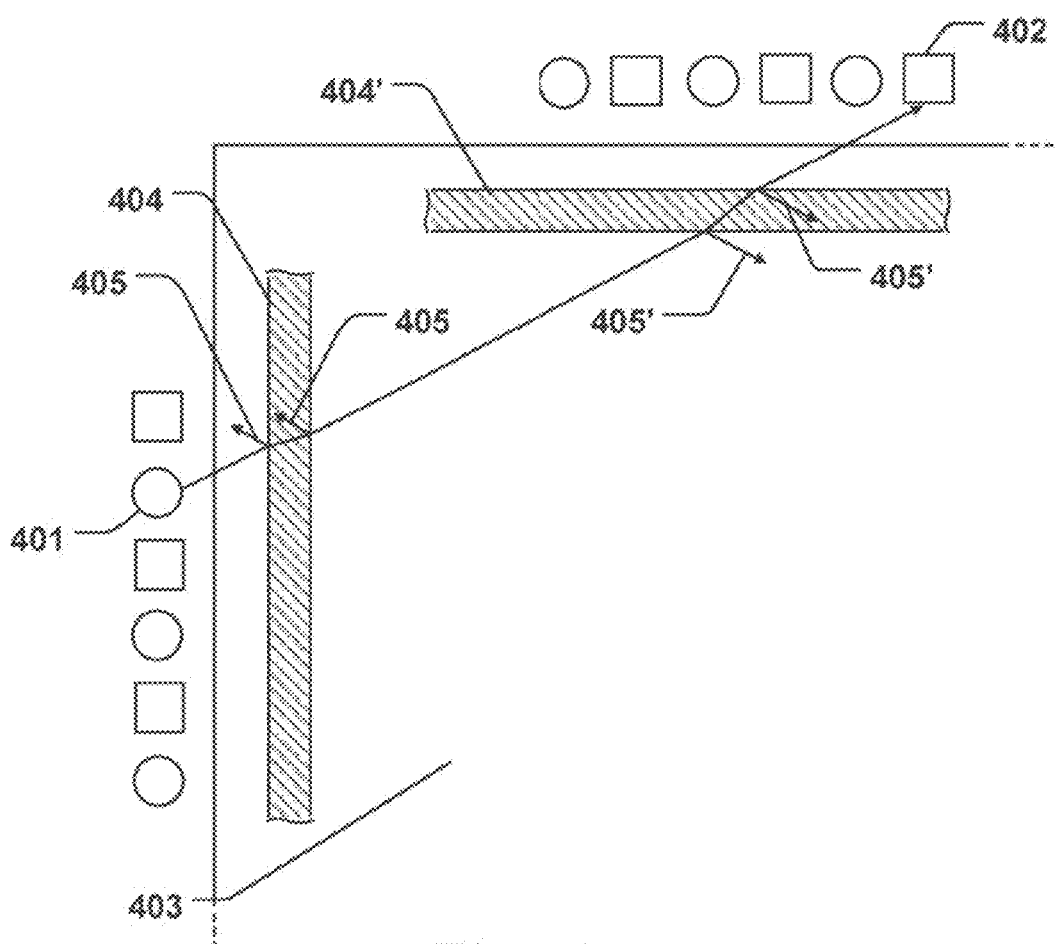
Figure 2:
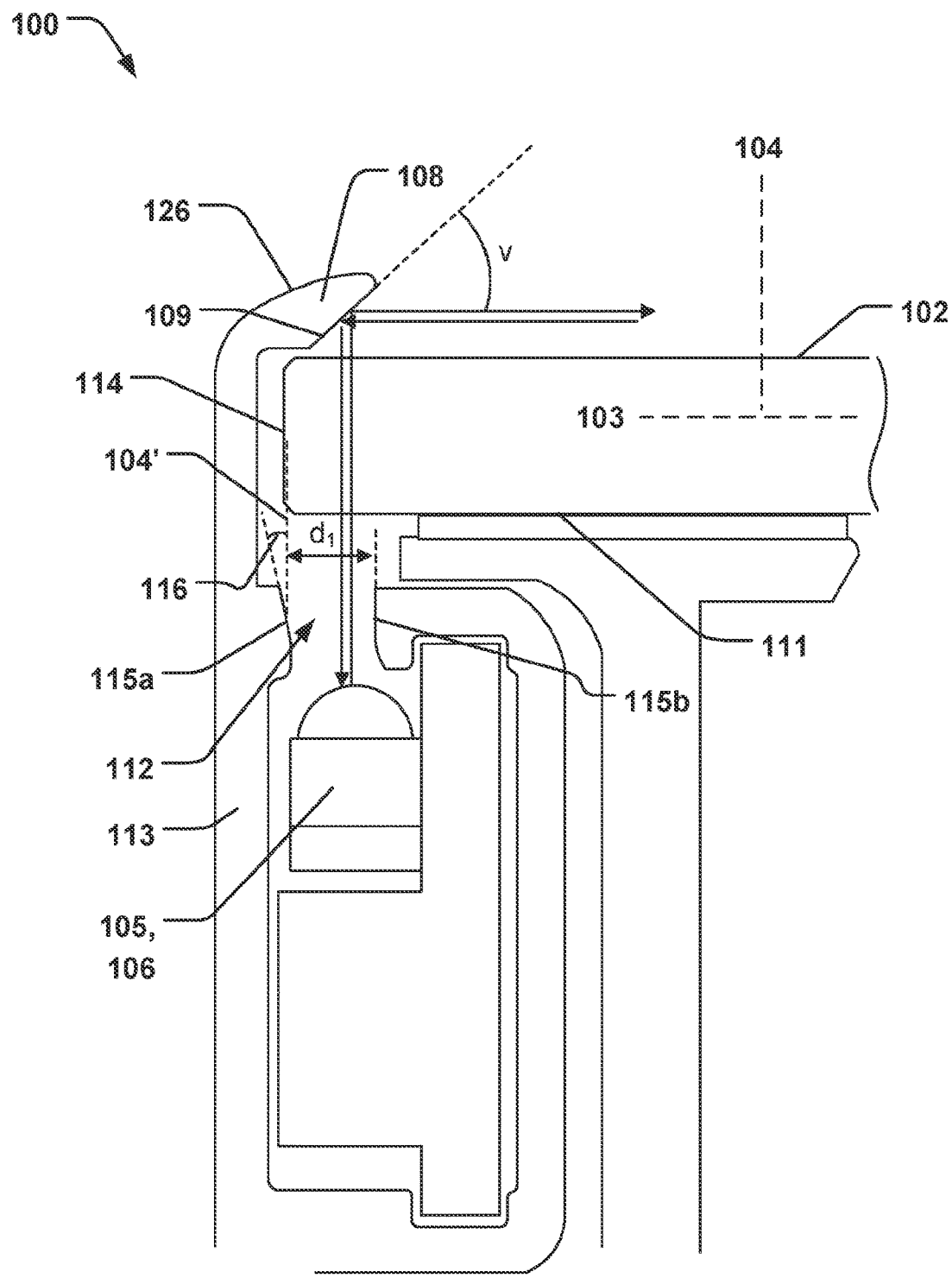
FIG. 2 is a schematic illustration, in a cross-sectional side view, of a touch-sensing apparatus, according to one example of the disclosure.
Figure 4:
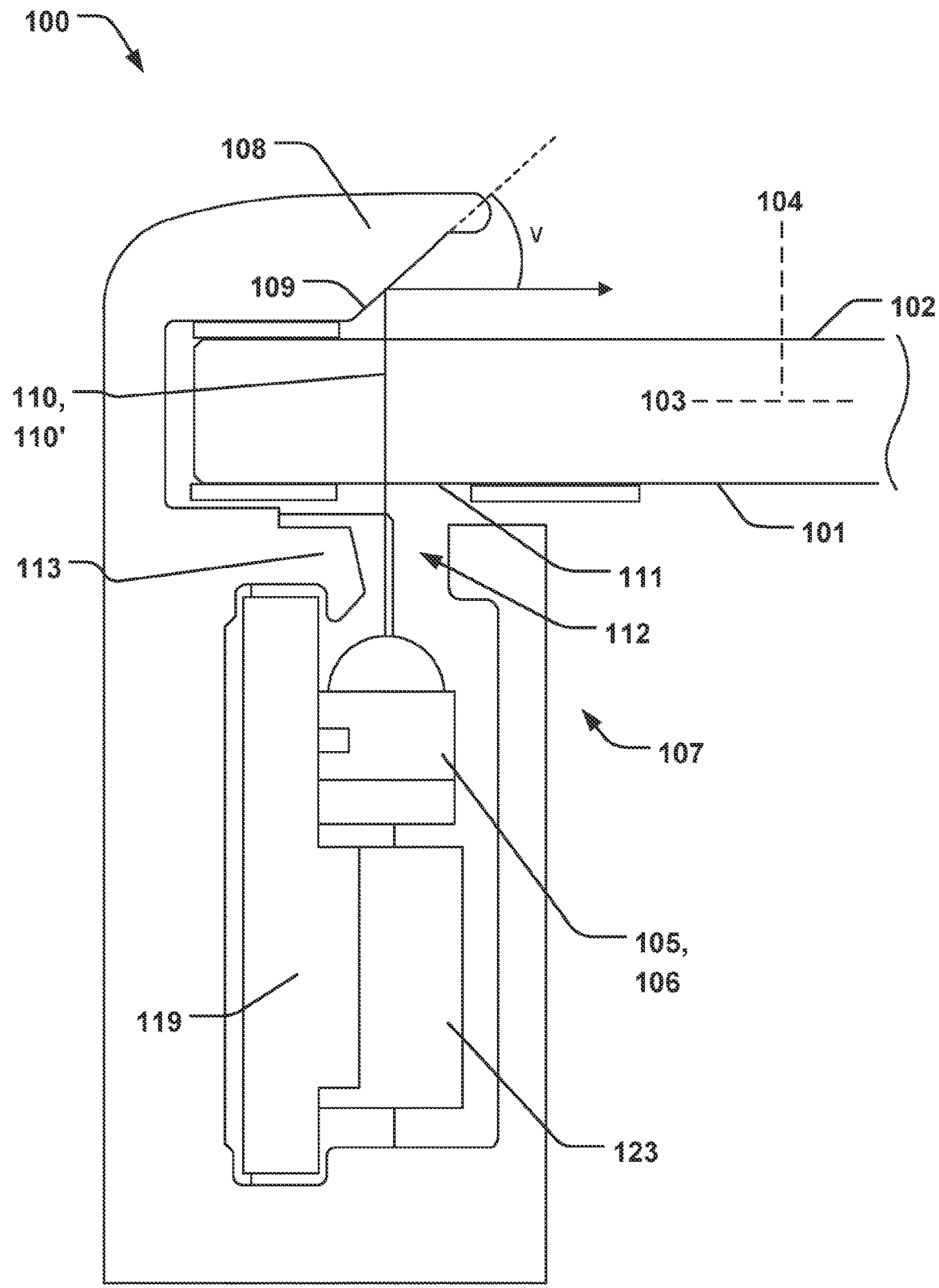
FIG. 4 is a schematic illustration, in a cross-sectional side view, of a touch-sensing apparatus, according to one example of the disclosure.

FIG. 1a is a schematic illustration of a touch-sensing apparatus 100 comprising a panel 101 that defines a touch surface 102 extending in a plane 103 having a normal axis 104. The panel 101 is a light transmissive panel. The touch-sensing apparatus 100 comprises a plurality of emitters 105 and detectors 106 arranged along a perimeter 107 of the panel 101. FIG. 1a shows only an emitter 105 for clarity of presentation, while FIG. 1b illustrates how light is transmitted from an emitter 105 to a detector 106 across the touch surface 102. The touch-sensing apparatus 100 comprises a light directing portion 108 arranged adjacent and along the perimeter 107. The light directing portion 108 comprises a light directing surface 109. The emitters 105 are arranged to emit light 110 and the light directing surface 109 is arranged to receive the light 110 and direct the light across touch surface 102 of the panel 101. The light is reflected to detectors 106, after propagating across the touch surface 102, via a corresponding light directing surface 109, as illustrated in FIG. 1b. FIG. 1c is a schematic top-down view of the touch-sensing apparatus 100. FIG. 2 shows also schematically the reflection from the emitters 105, and to the detectors 106. The panel 101 comprises a rear surface 111, opposite the touch surface 102, and the emitters 105 and/or the detectors 106 are arranged opposite the rear surface to emit and/or receive light 110 through a channel 112 in a frame element 113 of the touch-sensing apparatus 100. The channel 112 is arranged opposite the rear surface 111 and extends in a direction 104' of the normal axis 104, i.e. essentially in parallel with the normal axis 104. The light directing surface 109 and the channel 112 are arranged on opposite sides of the panel 101 and overlap along the direction of the plane 103. I.e. there is an overlap in the horizontal position of the light directing surface 109 and the channel 112 in FIG. 1a, so that the light path may extend vertically from the light directing surface 109 to the channel 112. The light directing surface 109 is arranged to receive light 110 from the emitters 105, or direct light to the detectors 106, through the panel 101 and further through the channel 112, in the direction 104' of the normal axis 104. It should be understood that the main optical axis 110' of light emission may be extending essentially along the direction 104', but that the light also has an angular spread around the optical axis 110', as indicated in FIG. 1a. Having the light directing surface 109 arranged above the channel 112 as exemplified in FIG. 1a and FIG. 4 provides for effective shielding of ambient light or system stray light. The amount of ambient or stray light reflected towards the detectors 106 may thus be minimized, and the signal to noise ratio can be improved. Having the emitters 105 emitting light 110 in the direction 104' of the normal 104, thus having an optical axis 110' of the light 110 essentially parallel with the normal axis 104, as further exemplified in FIG. 1a and FIG. 4, facilitates reducing the dimensions of the touch-sensing apparatus 100 along the perimeter. The cross-sectional footprint of the emitter 105—and detector 106 assembly may be minimized, e.g. in the direction of the plane 103 in FIGS. 1a and 4. The described arrangement may also provide for minimizing angular reflections against the panel 101, which can be advantageous in some applications. Having the light 110 propagating through the panel 101 provides for a further synergetic effect in terms of providing a compact touch-sensing apparatus 100 and minimizing the number of optical components since the panel 101 acts as a sealing element for the emitters 105 and detectors 106 from the surroundings. The panel 101 may thus act as a sealing portion to protect electronics from e.g. liquids and dust. Further optical scaling elements may thus be dispensed with. This is further advantageous in that the angle by which the light scatters across the panel 101 may be further increased, with less reflection losses, providing for an improved scanline coverage across the panel 101. For example, Fresnel reflection losses can be minimized, as described further with respect to FIG. 1d. FIG. 1d shows an example of a prior art touch-sensing apparatus, with emitters 401 and detectors 402 arranged along sides of a touch surface 403, and an optical sealing component 404 arranged along the sides. The optical sealing component 404 is arranged above the touch surface 403 and between the reflection surfaces on opposite sides which reflects the light across the touch surface 403 (i.e. corresponding to the position of the light directing surfaces 109). Having such additional optical sealing component 404 may introduce unwanted reflections by the light transmitted over the touch surface 403, in particularly when the light is reflected at high-angles along the sides of the touch surface 403, as indicated by reflection 406 in FIG. 1d. FIG. 1e is a further detailed view of the example in FIG. 1d, illustrating further reflections 405, 405', at each interface of such additional optical sealing component 404, 404'. Such reflections 405, 405', could lead to significant loss of light, particularly if having the additional optical scaling component 404, 404', along each side of the touch surface 403.

The reduced number of components may be particularly advantageous in some applications where additional compactness is desired. This provides also for reducing the cost of the touch-sensing apparatus 100. As will be described in more detail below, the light directing portion 108 may be formed as part of the frame element 113 so that the light directing surface 109 is formed in the material of the frame element 113. This further reduces the number of opto-mechanical components along the path of the light from the touch surface 102 to the emitters 105 and detectors 106. The number of components needing alignment is thus also reduced, which simplifies assembly. A particularly compact and robust touch-sensing apparatus 100 is thus provided, with more efficient use of detection light. Touch detection performance may thus be increased, while reducing complexity and costs.

An angle (v) between the light directing surface 109 and the plane 103 of the touch surface 102 may be less than 45 degrees, as exemplified in FIG. 2 and FIG. 4. This provides for reducing the amount of unwanted reflections of the light across the touch surface 102, again exemplified by the reflection 406 in FIG. 1d, which otherwise may cause artifacts or other disturbances when detecting the attenuation of the touch signal. Unwanted light reflections may instead be reflected out of the plane 103 if having the angle (v) less than 45 degrees. The angle (v) may be in the range 41-44 degrees in some examples, for a particularly advantageous reduction unwanted light reflections. The angle (v) may be more than 45 degrees. For example, having the angle (v) in the range 46-49 degrees can also reduce unwanted reflections of the type illustrated by scanline 406 in FIG. 1d. It should be understood that the advantageous benefits as described above for the touch-sensing apparatus 100, i.e. less complex, more compact and cost-effective manufacturing process, applies to examples where the angle (v) is both above 45 degrees and below 45 degrees.

The panel 101 has edges 114 extending between the touch surface 102 and the rear surface 111. The channel 112 extends in a direction parallel with the plane 102 with a width ($d_1$) between a first channel wall 115a, arranged closest to a respective edge 114 of the panel 101, and an opposite second channel wall 115b, as schematically illustrated in e.g. FIG. 2 and FIG. 5. The first channel wall 115a may extend with an angle 116 towards the direction 104' of the normal axis 104. Having an angled channel wall 115a provides for reducing the amount of ambient light reflected towards detectors 106. A larger portion of any ambient light being reflected against channel wall 115a will be reflected in a direction past the detector 106, while also reducing light from the emitter 105 which goes directly past the light directing surface 109, which may cause stray light problems.

Figure 3:
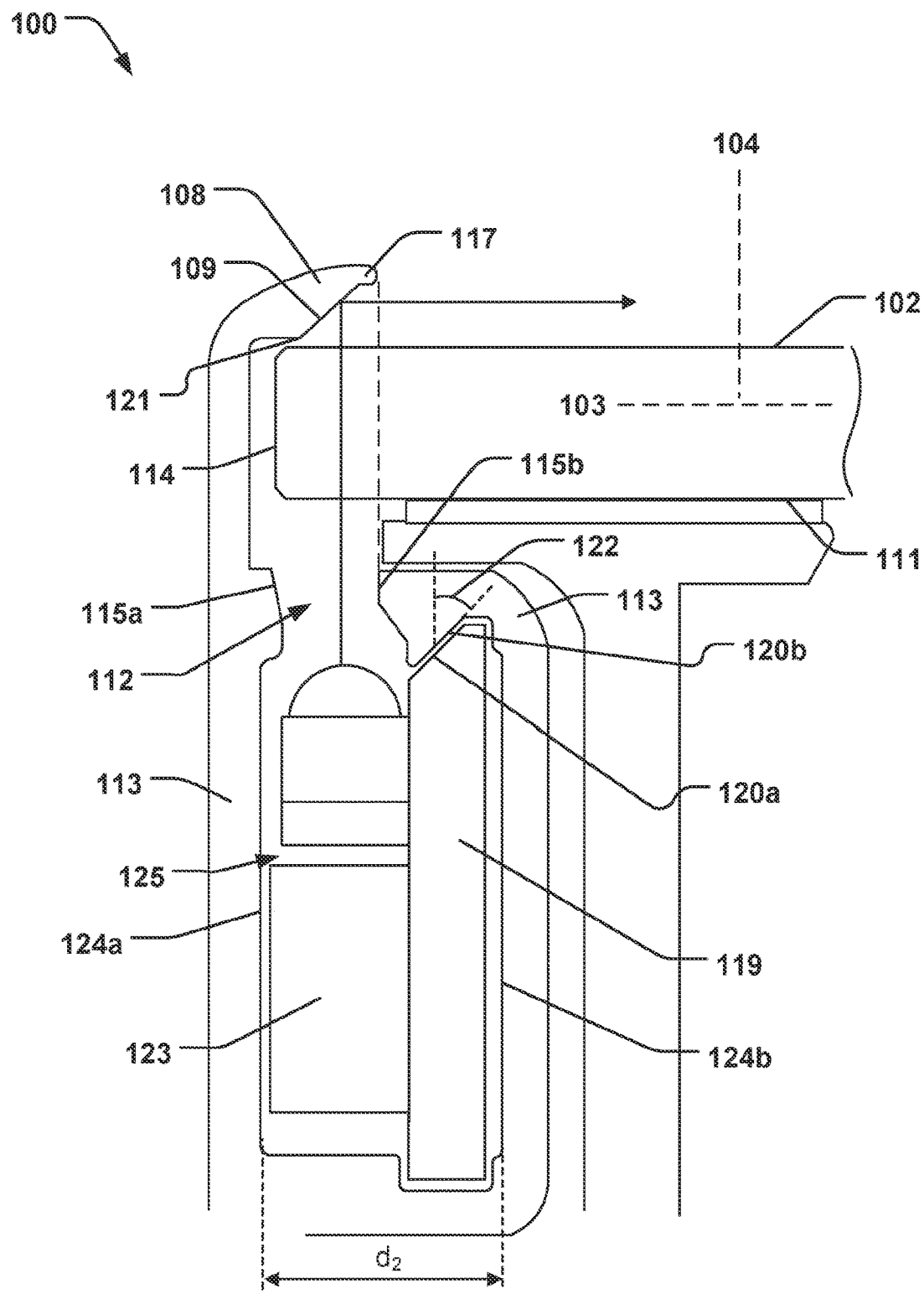
FIG. 3 is a schematic illustration, in a cross-sectional side view, of a touch-sensing apparatus, according to one example of the disclosure.
Figure 5:
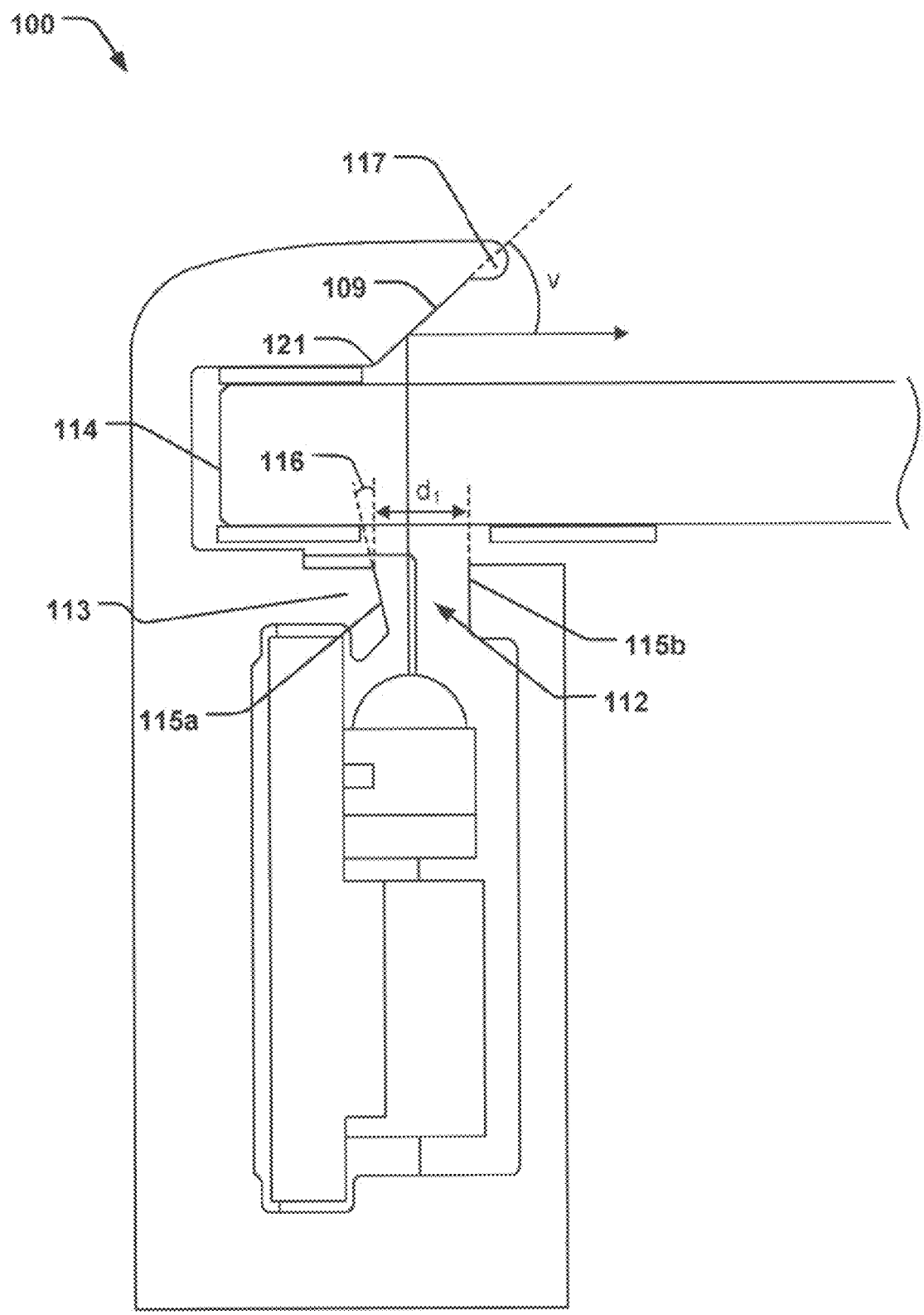
FIG. 5 is a schematic illustration, in cross-sectional side view, of a touch-sensing apparatus, according to one example of the disclosure.

The light directing portion 108 has an edge portion 121 corresponding to the part of the light directing portion 108 being arranged closest to the touch surface 102, as illustrated in FIG. 3 and FIG. 5. The light directing surface 109 may extend from the edge portion 121 of the light directing portion 108 to a protrusion 117 of the light directing portion 108, as schematically illustrated in FIG. 3 and FIG. 5. The protrusion 117 may extend in a direction parallel with the plane 103 to shield ambient light from being reflected towards the channel 112.

The width ($d_1$) of the channel 112 may be further varied for optimizing the amount of light 110 emitted towards the light directing surface 109 while providing sufficient shielding from ambient or stray light. The positions of the first and second channel walls 115a, 115b, along the direction of the plane 103 relative the emitters 105 and/or detectors 106 may be optimized depending on the particular implementation. In one example, as schematically illustrated in FIG. 3, the position of the second channel wall 115b is aligned with the position of the protrusion 117 along the direction of the plane 103. This may be particularly advantageous for shielding of ambient or stray light. At the same time blocking of the emitted light 110 may be avoided when optimizing the position of the emitters 105 relative the center of the channel 112. The surface properties of the channel walls 115a, 115b, may also be tailored to avoid loss of detection light or reduce the impact of ambient or stray light as described further below.

Figure 6:
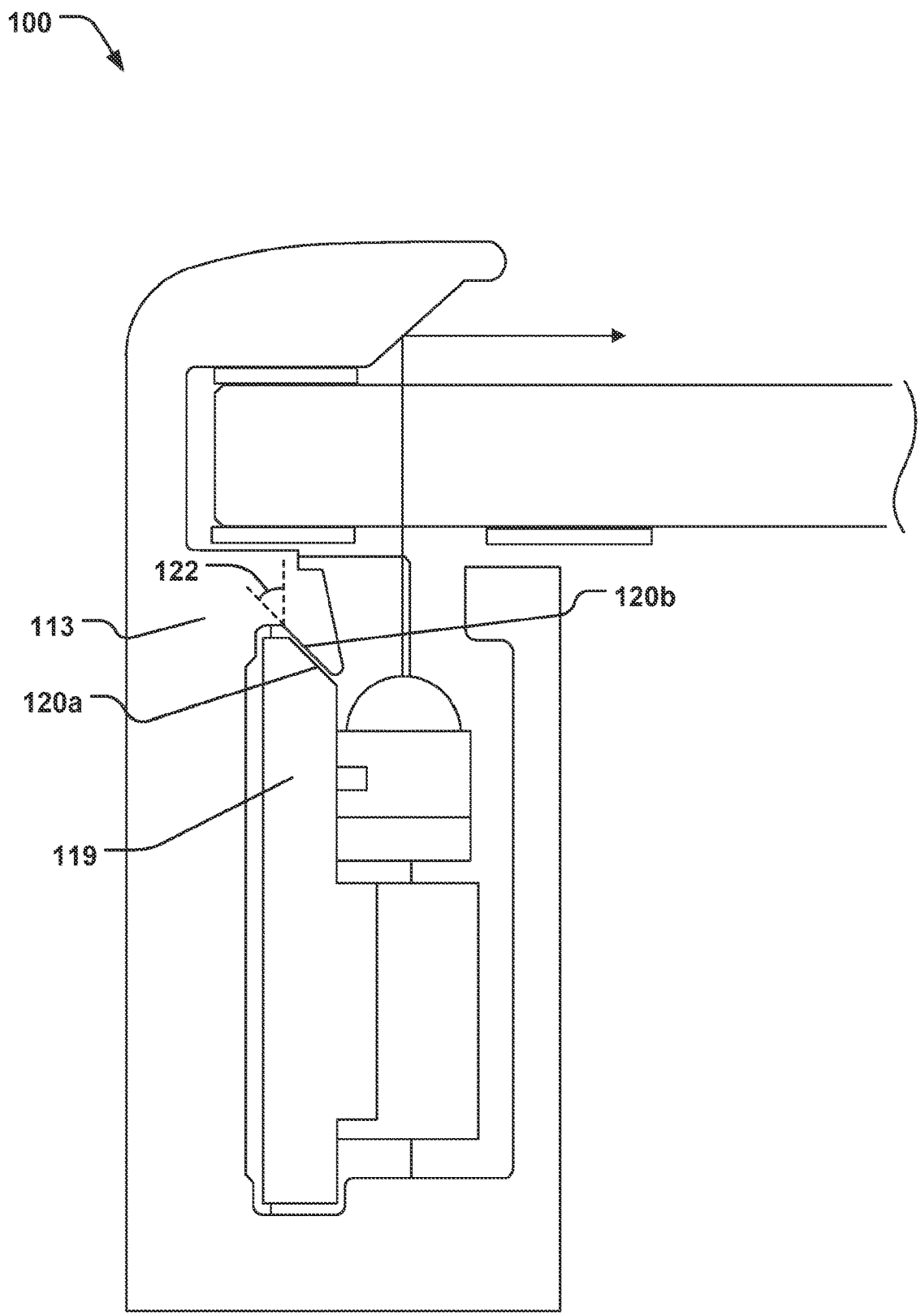
FIG. 6 is a schematic illustration, in a cross-sectional side view, of a touch-sensing apparatus, according to one example of the disclosure.

The emitters 105 and/or detectors 106 may be mounted to a substrate 119. The substrate 119 may comprise a chamfered edge 120a to be arranged opposite a corresponding mating surface 120b of the frame element 113. The mating surface 120b of the frame element 113 may form an angle 122 with the normal axis 104, as schematically illustrated in FIG. 3 and FIG. 6. The allows for effectively locking the substrate 119 in place in the correct position relative the frame element 113. A secure alignment of the emitters 105 and/or detectors 106 relative the light directing surface 109 may thus be facilitated, which in turn facilitates signal optimization. Providing an angled surface 120b of the frame element 113, as exemplified in FIG. 3, may at the same time allow for removing at least part of the second channel wall 115, closest to the substrate 119, and reduce the risk of blocking light from the emitters 105, or to the detectors 106 (see e.g. FIG. 2 versus FIG. 3).

The walls 115a, 115b, of the channel 112 may comprise a diffusive light scattering surface. The walls 115a, 115b, may thus also be utilized as reflective elements that allows better light management, e.g. recycling of light and reflecting light from lost directions towards the light directing surface 109. A larger portion of the emitted light 110 mat thus be utilized. At the same time, the surface of the walls 115a, 115b, may be tailored to provide a specular component of the reflected light. This allows for improving the directionality of the reflected light, e.g. for directing the light towards the light directing surface 109 above the panel 101. The ratio of the specular component of the reflected light may be varied by performing different surface treatments of the channel walls 115, 115b, to affect e.g. the surface roughness thereof. The reflecting properties of the light directing surface 109 may also be varied by such surface treatments, which may comprise etching, bead blasting, sand blasting, brushing, and/or anodization, as described in more detail below.

A support 123 may be attached to the substrate 119, as exemplified in FIG. 3 and FIG. 4. The support 123 may extending in a direction parallel with the plane 103 between the substrate 119 and a frame wall 124a, 124b, of the frame element 113. The support 123 may facilitate alignment of the substrate 119 relative the frame element 113. This may facilitate manufacturing and allow for accurate positioning of the emitters 105 and/or detectors 106 relative the frame element 113.

The frame element 113 may be shaped to form a cavity 125. The emitters 105 and/or detectors 106 are mounted to a substrate 119 and the substrate 119 may be arranged in the cavity 125 so that the emitters 105 and/or detectors 106 are arranged closer to the respective edge 114 of the panel 101 than the substrate 119, as schematically illustrated in FIG. 3. This provides for minimizing the width of the bezel, i.e. the width of the light directing portion 108 along the direction of the plane 103, since the emitters 105 and/or detectors 106 are placed closer to the edges 114 of the panel 101, while maintaining the advantageous sealing effect of the panel 101 as mentioned above. A more compact touch-sensing apparatus 100 is thus provided.

In particular, the cavity 125 may extend in a direction parallel with the plane 103 with a width ($d_2$) between a first frame wall 124a, arranged closest to the respective edge 114 of the panel 101, and an opposite second frame wall 124b. The substrate 119 may be arranged in the cavity 125 so that the emitters 105 and/or detectors 106 are arranged closer to the first frame wall 124a than the substrate 119, as exemplified in FIG. 3. This allows for minimizing the width of the bezel along the direction of the plane 103.

The substrate 119 may extend with an elongated shape in a direction 104' of the normal axis 104, as exemplified in FIG. 2. This provides for reducing the dimensions of the touch sensing apparatus 100 in the direction perpendicular to the normal axis 104, which may be desirable in some applications where the amount of space in this direction is limited, and/or when the ratio of available touch surface 102 to the surrounding frame components is to be optimized. Having the substrate 119 extending along the direction 104' of the normal axis 104 combined with having the emitters 105 and/or detectors 106 arranged closer to the first frame wall 124a than the substrate 119 provides for particularly efficient utilization of space along the direction of the plane 103.

Figure 9A:
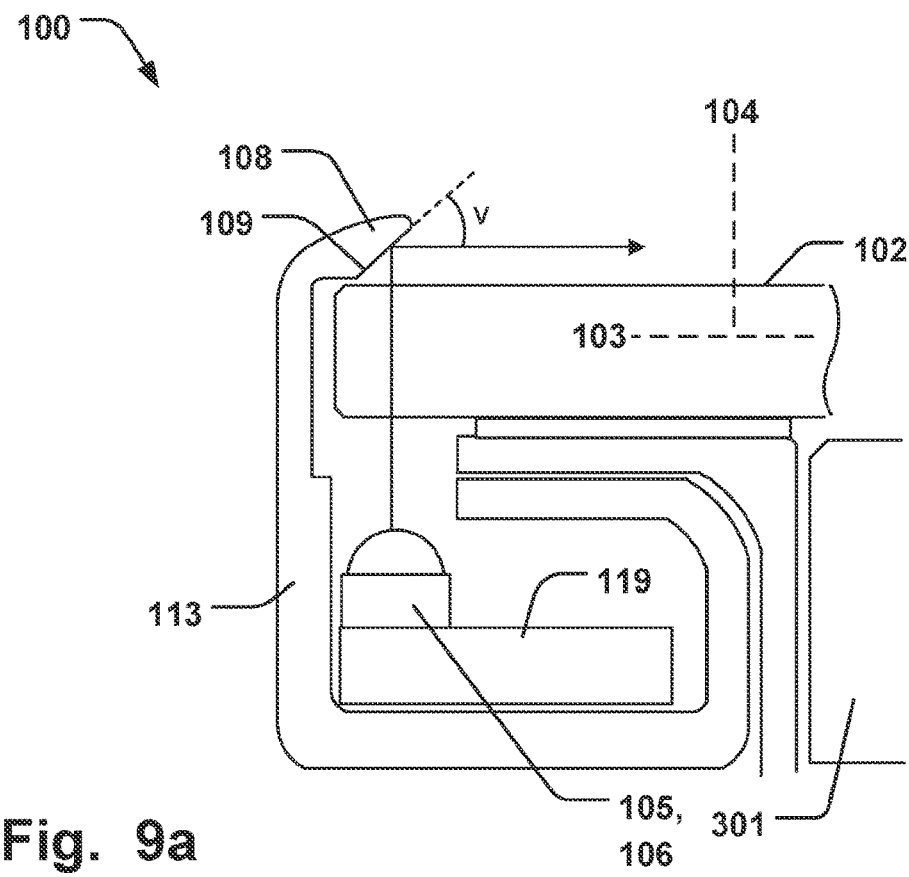
FIG. 9a is a schematic illustration, in a cross-sectional side view, of a touch-sensing apparatus, according to one example of the disclosure.
Figure 9B:
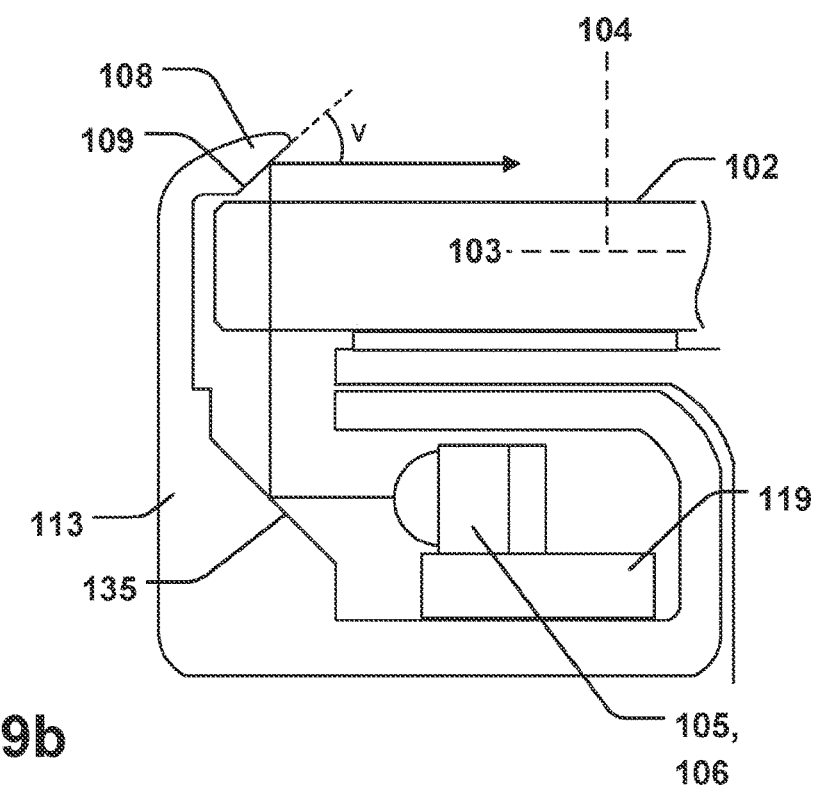
FIG. 9b is a schematic illustration, in a cross-sectional side view, of a touch-sensing apparatus, according to one example of the disclosure.

FIG. 9a show an example where the substrate 119 extends along the direction of the plane 103, which provides for achieving compact dimensions along the direction of the normal axis 104. This may be advantageous when utilized in conjunction with particularly flat display panels 301, although the dimensions in the direction of the plane 103 around the displayed area may increase in such case. FIG. 9b is another example where the substrate 119 extends along the direction of the plane 103, but the emitters 105 and/or detectors 106 are arranged to emit/receive light in the direction of the plane 103 via a reflective surface 135. This provides for achieving compact dimensions along the direction of the normal axis 104. The reflective surface 135 may be a specular reflective surface.

The light directing surface 109 may be anodized metal. The light directing surface 109 may also be surface treated to diffusively reflect the light 110 towards the touch surface 102. The anodization process changes the microscopic texture of the surface 109, and increases the thickness of the natural oxide layer on the surface 109. The thickness and porosity of the anodized oxide surface may be varied. The anodized surface may be dyed in various colors for achieving the desired appearance. Several different colors may provide advantageous reflectance values in the infrared range, such as over 80%, for example aluminium being anodized in black, grey or silver. Other metals may also provide advantageous reflectance characteristics, such as silver. It may be particularly advantageous to use wavelengths above 940 nm where many anodized materials start to reflect significantly. Different colors may also be provided by using different alloys of e.g. aluminium. The diffusive and specular reflection components of the reflectance may be varied by performing different surface treatments of the anodized metal or alloys. The surface roughness may thus be varied to optimize the ratio of the aforementioned reflection components. The directionality of the reflected light may be increased by increasing the specular component, whereas the amount of random scattering increased with the diffusive component. For example, increasing the specular component of the reflection from the light directing surface 109 may increase the strength of the scan lines. In such case the number and/or position of the emitters 105 may be varied to compensate for any narrowing of the scanlines resulting from reduction in diffusive light scattering. Hence, in some examples, the reflective characteristics of the light directing surface 109 may be optimized, while allowing for the desired aesthetic appearance of an anodized surface.

Different surface roughness characteristics may be achieved by various processes, such as etching, sand blasting, bead blasting, machining, brushing, polishing, as well as the anodization mentioned above. In one example, the light directing surface 109 may have a surface roughness defined by a slope RMS ($\Delta q$) between 0.1-0.35. The slope RMS ($\Delta q$) may be between 0.1-0.25 for an advantageous diffusivity. Higher values may decrease the strength of the signals, and too low signals may lead to a more tolerance sensitive systems where the angle ($\varphi$) by which the light is spread in the plane 103 across the touch surface 102 (as indicated by angle $\varphi$ in the example of in FIG. 1c) is reduced and limited by emitter and detectors viewing angles. Also, scanline width may become too narrow. In another example the slope RMS ($\Delta q$) may be between 0.13-0.20 for a particularly advantageous diffusivity providing for an optimized signal strength and touch detection process, while maintaining an advantageous power consumption of the components of the touch sensing apparatus 100.

When having appropriate slope variation, the height variations of blasted or etched surface are typically in the 1 to 20 um range. However the slope RMS ($\Delta q$) optimization as described above provides for the most effective tailoring of the reflective characteristics. In some examples the light directing surface 109 has a low roughness. In one example, the light directing surface 109 may be an anodized metal surface which has not undergone any processing to increase the surface roughness. The light directing surface 109 may in such case be anodized directly after the extrusion process. The light directing surface 109 may in such case be mirror-like, i.e. the surface 109 has not undergone any processing to achieve spreading of the light. In such case the slope RMS (Δq) may be between 0-0.1, for providing a mirror-like surface. Such surface may be advantageous in applications where narrow scanlines are desired for a particular touch detection process. E.g. when it is advantageous to increase the amount of available detection light in desired directions across the touch surface 102.

The frame element 113 may comprise the light directing portion 108. I.E., the light directing portion 108 is formed directly from the frame element 113 as an integral piece, e.g. by extrusion. The frame element 113, and the light directing portion 108, may be formed from various metals, such as aluminium. The light directing surface 109 may thus be an anodized metal surface of the frame element 113. The frame element 113 may thus be utilized as a diffusive light scattering element, without having to provide a separate optical component for diffusive light scattering. The number of components may thus be reduced even further with such integrated light directing surface 109. This further removes the need for having an additional optical sealing element to protect such separate optical component. A more robust touch-sensing apparatus 100 which is easier to assemble is thus provided. Further, the surface of the walls 115a, 115b, of the channel 112 may be a metal surface of the frame element 113. The reflective characteristics of the walls 115a, 115b, may be tailored as mentioned above with respect to the light directing surface 109. The frame element 113 may form a cavity 125 in which the emitters 105 and/or detectors 106 are arranged. The frame element 113 may thus be formed as a single integral piece with light directing surfaces 109, 115a, 115b, and cavity 125 for the substrate 119, as well as any mounting interface 129 to a back frame 302 for a display 301, as schematically indicated in FIG. 1a. This allows for minimizing the number of opto-mechanical components of the touch-sensing apparatus 100, further providing for a particularly robust touch-sensing apparatus 100 which is less complex and more viable for mass-production.

The light directing portion 108 may comprise an outer surface 126 opposite the light directing surface 109, as indicated in e.g. FIG. 2. The light directing surface 109 may have a higher reflectance than the outer surface 126. Providing the light directing portion 108 of the frame element 113 with different surface treatments allows for having an effective and optimized scattering of light across the touch surface 102, via the light directing surface 109, while the outer surface 126 facing the user has a low reflectance for minimizing light reflections towards the user. Further, this provides for giving a desired cosmetical appearance, while not affecting the optical function (e.g. avoiding having light directing surface 109 too matte by having too high slopes. A particularly effective utilization of the manufacturing materials may thus be realized, since sections of a single integral piece of the frame element 113 may be uniquely treated to achieve the desired functionality of light reflectivity. For example, alignment of separate optical components is not needed.

In one example, the walls 115a, 115b of the channel 112 may have a higher specular reflectance than the light directing surface 109. This may provide for a more controlled reflection of emitted light towards the light directing surface 109. The light directing surface 109 may in turn provide a larger diffusive component for broadening of the scanlines across the touch surface 102.

In one aspect a touch sensing apparatus 100 is provided, comprising a panel 101 that defines a touch surface 102 extending in a plane 103 having a normal axis 104. A plurality of emitters 105 and detectors 106 arranged along a perimeter 107 of the panel 101. A light directing portion 108 is arranged adjacent the perimeter 107 and comprises a light directing surface 109. The emitters 105 are arranged to emit light 110 and the light directing surface 109 is arranged to receive the light 110 and direct the light 110 across the touch surface 102. The panel 101 comprises a rear surface 111, opposite the touch surface 102. The emitters 105 and/or the detectors 106 are arranged opposite the rear surface 111 to emit and/or receive light through a channel 112 in a frame element 113. The light directing surface 109 receive light from the emitters 105, or direct light to the detectors 106, through the panel 101 and through the channel 112. The frame element 113 is formed from a metal and comprises the light directing portion 108, where the light directing surface 109 is an anodized metal surface of the frame element 113. The frame element 113 may also form a cavity 125 in which the emitters 105 and/or the detectors 106 are arranged so that an optical axis 110' of the emitted light 110 is essentially parallel with the normal axis 104. The touch sensing apparatus 100 thus provides for the advantageous benefits as described above, by providing for a compact touch sensing apparatus 100 with improved signal to noise ratio and increased touch detection performance.

Figure 7A:
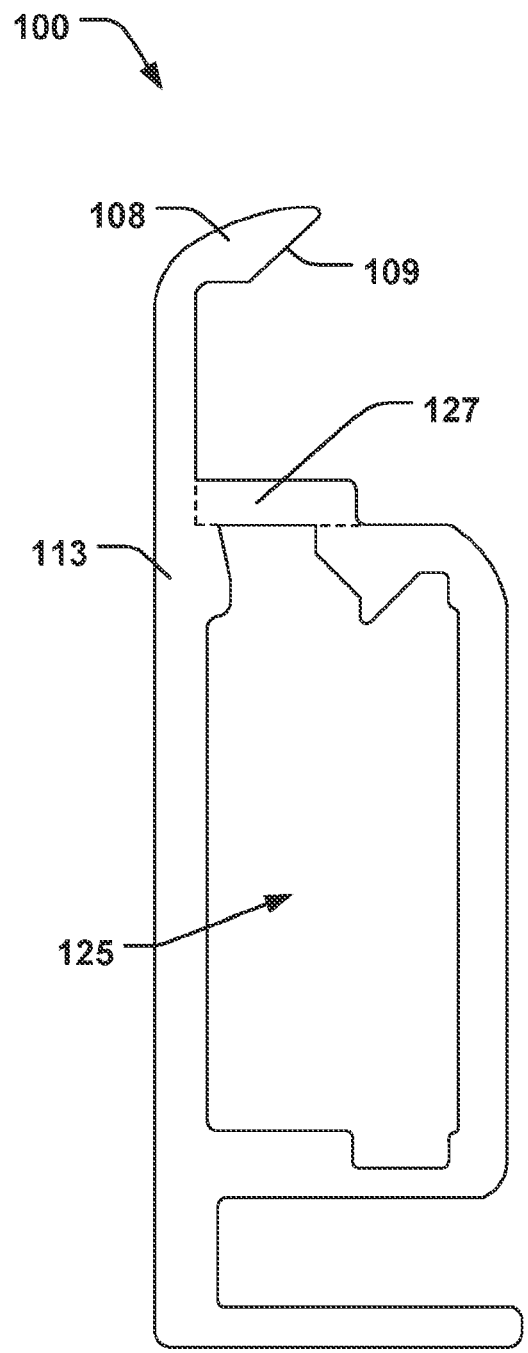
FIGS. 7a-c are schematic illustrations, in a cross-sectional side views, of a frame element for a touch-sensing apparatus, according to examples of the disclosure.
Figure 7B:
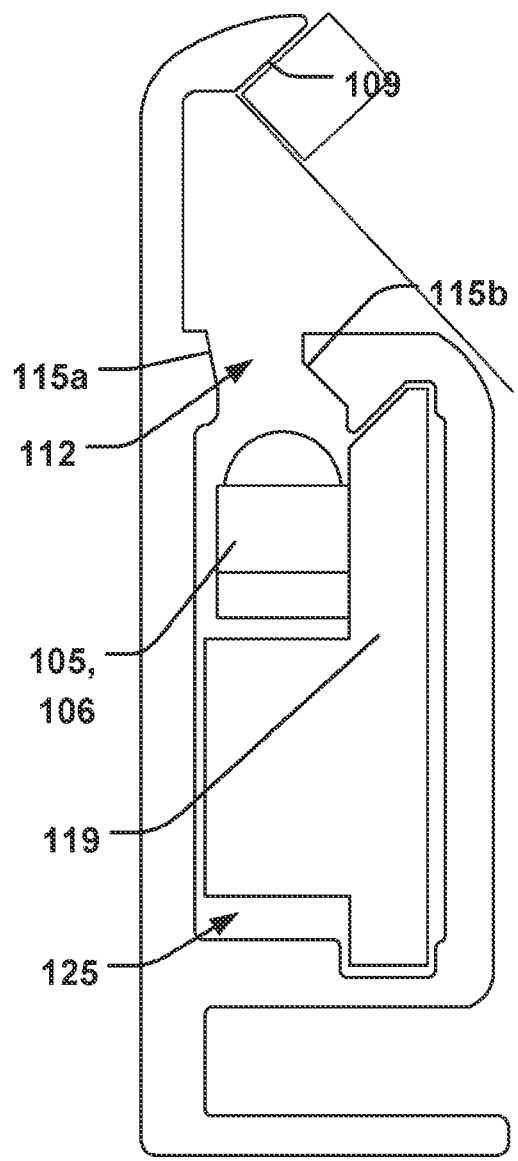

FIG. 10a is a flowchart of a method 200 of manufacturing a frame element 113 for a touch sensing apparatus 100. The method 200 comprises extruding 201 the frame element 113 to form a light directing portion 108 and a cavity 125 adapted to receive a substrate 119 comprising emitters 105 and/or detectors 106. FIG. 7a shows an example of such extruded frame element 113. The method 200 further comprises milling 202 a wall portion 127 of the cavity 125 to form a channel 112. FIG. 7a indicates with dashed lines the wall portion 127 which is milled away, so that an open channel 112 is provided into the cavity 125, as exemplified in FIG. 7b. The channel 112 is defined by channel walls or surfaces 115a, 115b. A light directing surface 109 of the light directing portion 108 may thus receive light from the emitters 105, or direct light to the detectors 106, through the channel 112, when the substrate 119 is arranged in the cavity 125. Thus, a single integral piece of the frame element 113 may be provided, by the extrusion 201 and milling 202, which incorporates the functions of alignment and support for the substrate 119 as well as light directing surfaces 109, 115a, 115b. A facilitated manufacturing is provided while the structural integrity and the desired tolerances of the frame element 113 may be maintained during the process. Further, the milling 202 provides for customizing the dimensions of the channel 112, which is difficult during the extrusion process.

Figure 7C:
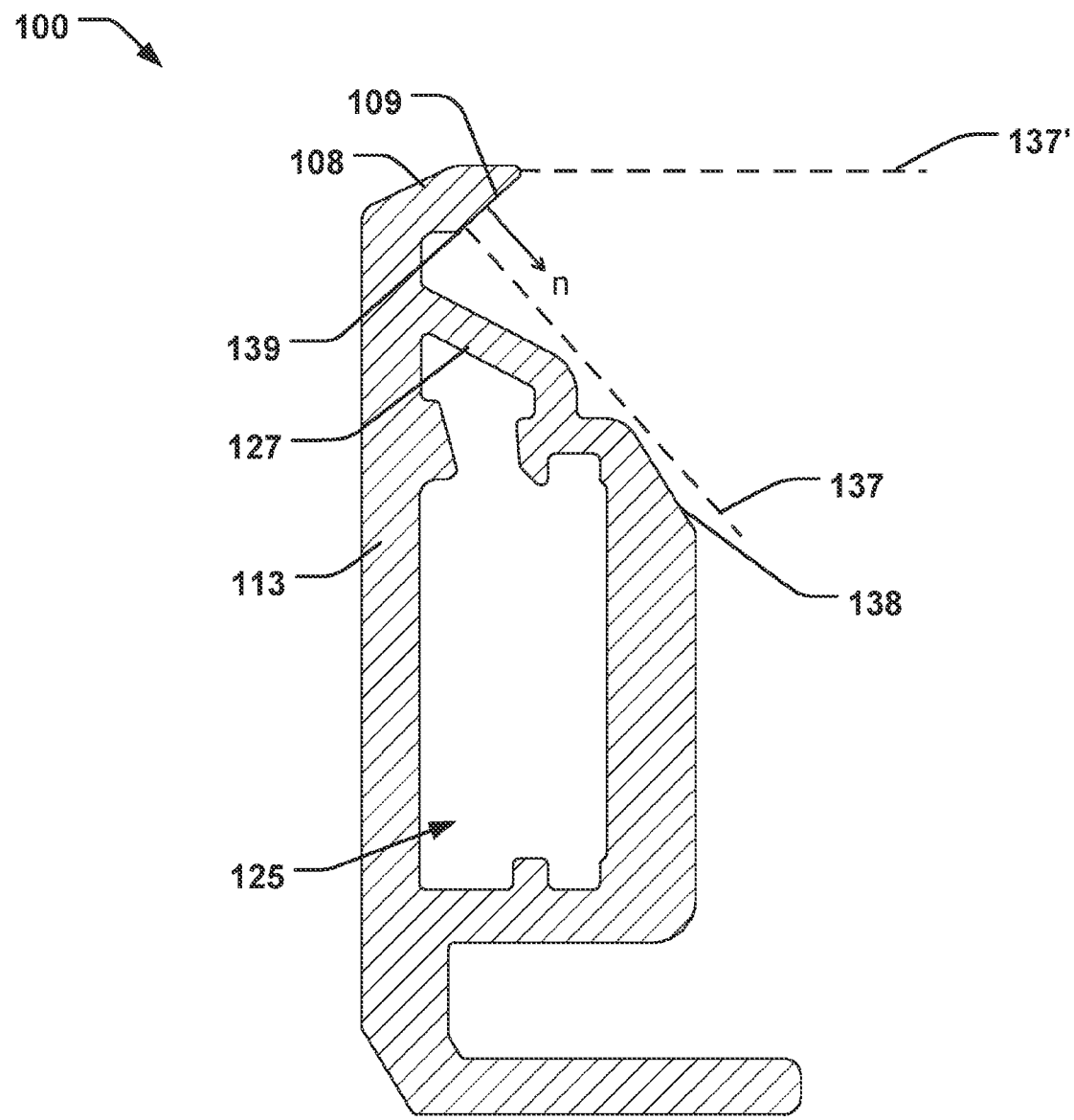

FIG. 7c shows another example of an extruded frame element 113. The frame element 113 may be shaped so that the light directing surface 109 has a free line of sight 137, 137' to facilitate any subsequent surface treatment of the light directing surface 109. The line of sight 137, 137', may extend in parallel with the normal (n) of the light directing surface 109. FIG. 7c shows an example where the line of sight of the light directing surface 109 is indicated with lower dashed line 137 corresponding a normal (n) to the surface 109, and upper dashed line 137'. Having a free line of sight 137, 137', i.e. no obstruction or intersection of the described sight lines 137, 137', by the frame element 113 allows for optimizing subsequent surface treatment processes of the light directing surface 109, such as sand blasting. Obtaining the desired characteristics of the light directing surface 109 may thus be facilitated. The frame element 113 may comprise a sloped portion 138, as schematically indicated in FIG. 7c, which allows for obtaining a free line of sight 137, 137', of the light directing surface 109 as described above, while maintaining a compact profile of the frame element 113. The sloped portion 138 may be arranged so that the lower sight line 137, corresponding to the intersection point of a normal (n) with the surface 109 at a lower endpoint 139 of the surface 109 (closest to the wall portion 127), may be extended beyond the frame element 113 without intersecting with the frame element 113 or the sloped portion 138, as illustrated in the example of FIG. 7c. This provides for a facilitated access for surface treatment of the entire light directing surface 109 while maintaining a particularly compact frame element 113. The wall portion 127 may be part of the sloped portion 138.

FIGS. 10b-c are further flowcharts of a method 200. The method 200 may comprise etching, or bead- or sand blasting 2011, 2031, the light directing surface 109. The light directing surface 109 may thus be provided with different reflectance characteristics. In one example the etching, or bead- or sand blasting 2011 the light directing surface 109 is performed before milling 202, as indicated in FIG. 10b. The light directing surface 109 may thus be provided with different reflectance characteristics without affecting the surfaces 115a, 115b, of the channel 112, which are shielded by the wall portion 127, e.g. during an sand blasting process. As mentioned above, it may be advantageous to maintain a larger specular reflection component of the walls 115a, 115b, as provided after the extrusion process, while the light directing surface 109 may be subsequently treated to provide more diffusive reflection. In some examples, the etching, or bead- or sand blasting 2031 the light directing surface 109 may be performed after said milling 202, as indicated in FIG. 10c. In some examples, the etching, or bead- or sand blasting 2031 the light directing surface 109 may be performed after an additional milling step 203 described below, as further indicated in FIG. 10c. The method 200 may comprise anodization 204 of the metal of the frame element 113, as described above.

Figure 8A:
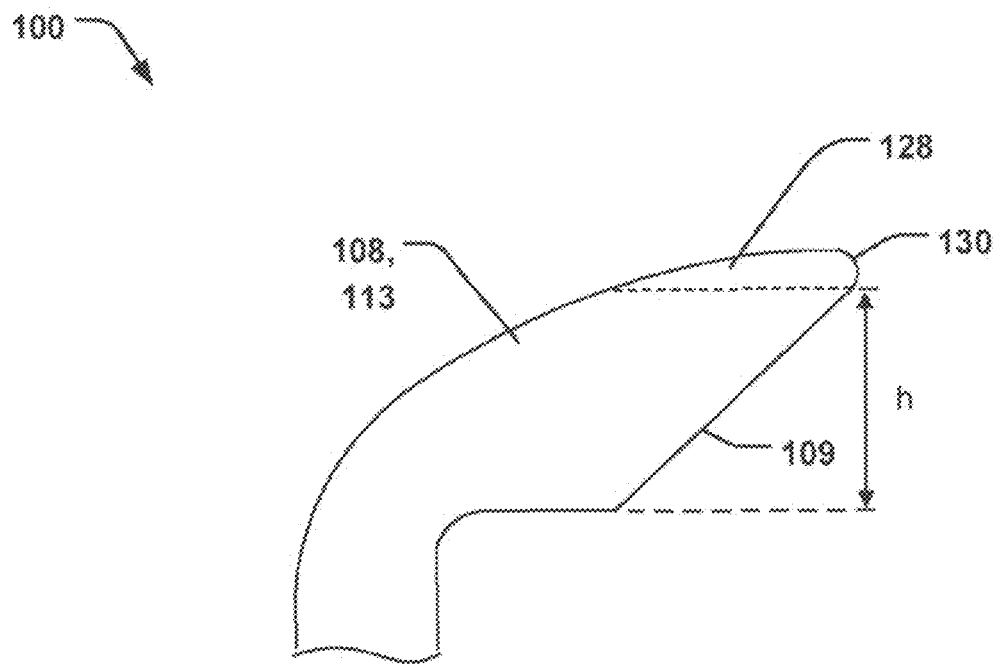
FIGS. 8a-b are schematic illustrations, in a cross-sectional side views, of a detail of a frame element for a touch-sensing apparatus, according to examples of the disclosure.
Figure 8B:
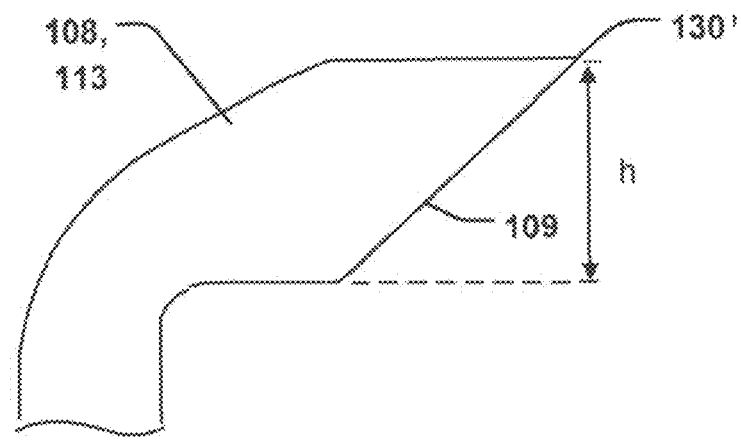

The method 200 may comprise milling 203 a top portion 128 of the extruded light directing portion 108 so that a height (h) of the light directing portion 109 above a touch surface 102 of a panel 101, when arranged in the frame element 113, is reduced. FIG. 8a shows a detailed view of an example of the light directing portion 108 after extrusion. The radius of tip 130 of the top portion 128 is limited by the extrusion process. FIG. 8b show the light directing portion 108 after the top portion 128 has been milled away along the dashed line in FIG. 8a. The milled light directing portion 108 has a height (h) and the corresponding tip 130', as indicated in FIG. 8b, is sharper, i.e. the radius is reduced compared to the tip 130 provided after the extrusion. Thus, a more compact light directing portion 108 has been provided, by milling away the top portion 128, while the portion of the light directing portion 108 which is useful for reflecting the light across the touch surface 102 is essentially unaffected. The rounded tip 130 in FIG. 8a is not useful for directing the light across the touch surface 102. The round tip 130 has thus been removed as illustrated in FIG. 8b. Milling the top portion 128 thus provides for a more effective utilization of the height of the light directing portion 108. A sufficient height, or height distribution, of the scanline above the touch surface 102 may thus be provided, to allow for secure identification of different touch objects with different tip sizes, while minimizing the bezel height. In some examples, the height is in the range 1.5-2 mm. A height of 1.8 mm may in some examples be particularly advantageous, providing the appearance of a flush bezel.

Figure 8C:
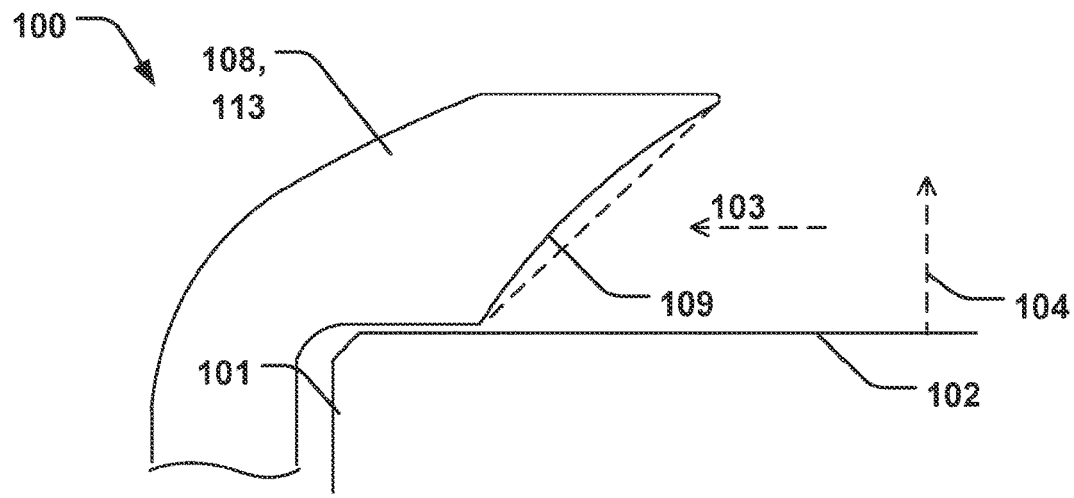
FIG. 8c is a schematic illustration, in a cross-sectional side views, of a detail of a frame element for a touch-sensing apparatus, according to one example of the disclosure.

The light directing surface 109 may be concave as schematically illustrated in FIG. 8c. Having a light directing surface 109 which is concave towards the touch surface 102 provides for controlling the direction of the reflected light as desired and increasing the signal strength of the scanlines. The light directing surface 109 may be parabolic concave. Since the light directing surface 109 may be formed directly in the frame element 113, as described above, the concave shape may be shaped directly in the frame element 113. Thus, the light reflection may be controlled by shaping the frame element directly 113, without having to introduce any additional optical component.

Figure 8D:
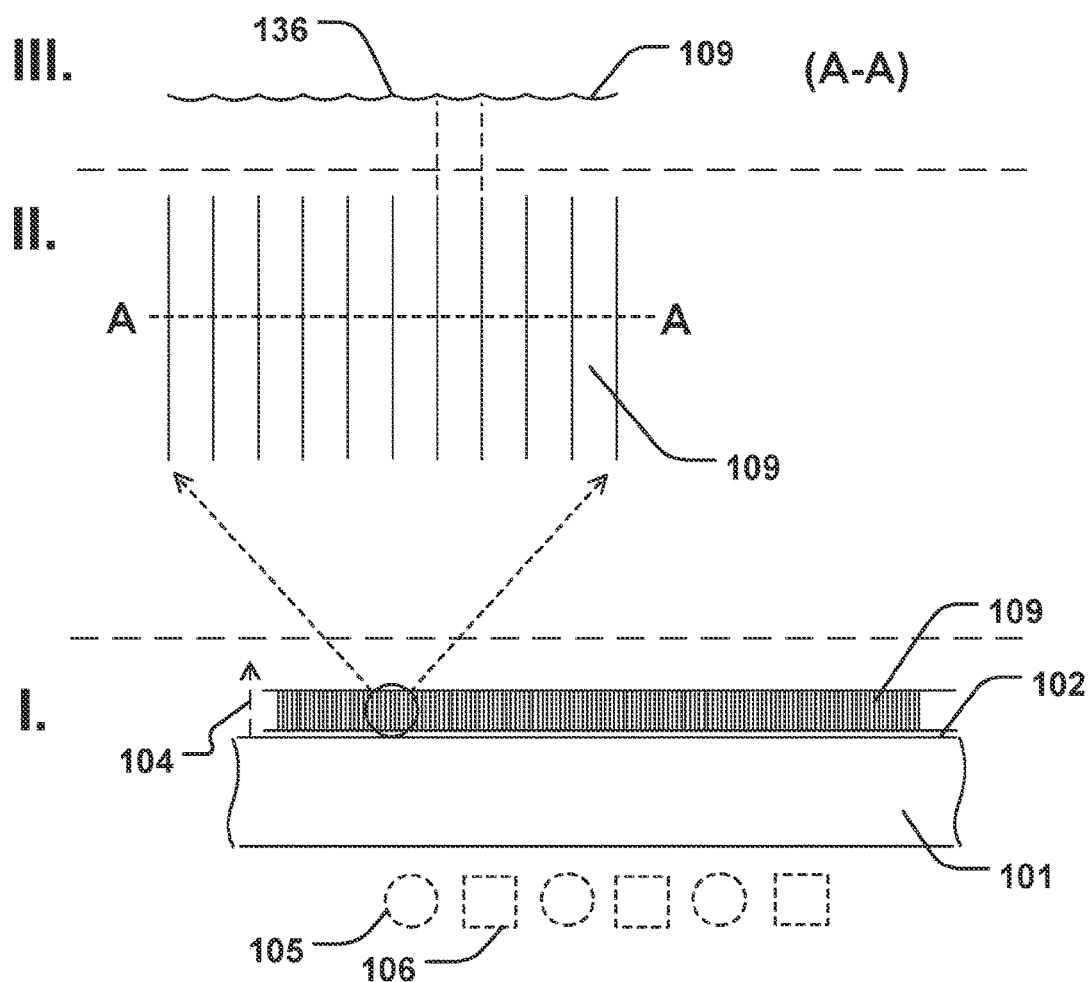
FIG. 8d are schematic illustrations of a detail of a frame element comprising a light directing surface, for a touch-sensing apparatus, in a view along the direction of a plane of a touch surface (I); a detailed section of the light directing surface (II), from the view in (I); and a side-view (III) of the section in (II), according to examples of the disclosure.

FIG. 8d are schematic illustrations of a detail the light directing surface 109, in different views I-III. The first view (I) is along the direction 103 of the plane 103, e.g. along arrow 103 in FIG. 8c. The light directing surface 109 is thus illustrated as an elongated portion, arranged above the panel 101, and the emitters 105 and detectors 106 below the panel 101. FIG. 8d shows in the second view (II) a detailed section of the light directing surface 109. The light directing surface 109 may be milled or otherwise machined to form a pattern in the surface 109. The third view (III) of FIG. 8d is a cross-section along A-A in view (II), where an example of such pattern is shown, with periodic ridges 136 forming an undulating pattern or grating. Different patterns may be formed directly in the frame element 113 by milling or other machining processes, to provide a light directing surface 109 with desired reflective characteristics to control the direction of the light across the touch surface 102.

Further examples of diffusive light scattering surfaces are described in the following. Any of the diffusive light scattering surfaces described may be provided on the light directing surface 109. The diffusive light scattering surface may be configured to exhibit at least 50% diffuse reflection, and preferably at least 70-85% diffuse reflection. Reflectivity at 940 nm above 70% may be achieved for materials with e.g. black appearance, by anodization as mentioned above (electrolytic coloring using metal salts, for example). A diffusive light scattering surface may be implemented as a coating, layer or film applied by e.g. by anodization, painting, spraying, lamination, gluing, etc. Etching and blasting as mentioned above is an effective procedure for reaching the desired diffusive reflectivity. In one example, the diffusive light scattering surface is implemented as matte white paint or ink. In order to achieve a high diffuse reflectivity, it may be preferable for the paint/ink to contain pigments with high refractive index. One such pigment is $TiO_2$, which has a refractive index n=2.8. The diffusive light scattering surface may comprise a material of varying refractive index. It may also be desirable, e.g. to reduce Fresnel losses, for the refractive index of the paint filler and/or the paint vehicle to match the refractive index of the material on which surface it is applied. The properties of the paint may be further improved by use of EVOQUE™ Pre-Composite Polymer Technology provided by the Dow Chemical Company. There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc. Alternatively, the diffusive light scattering surface may be implemented as a flat or sheet-like device, e.g. the above-mentioned engineered diffuser, diffuser film, or white paper which is attached by e.g. an adhesive. According to other alternatives, the diffusive light scattering surface may be implemented as a semi-randomized (non-periodic) microstructure on an external surface possibly in combination with an overlying coating of reflective material.

A micro-structure may be provided on such external surface and/or an internal surface by etching, embossing, molding, abrasive blasting, scratching, brushing etc. The diffusive light scattering surface may comprise pockets of air along such internal surface that may be formed during a molding procedure. In another alternative, the diffusive light scattering surface may be light transmissive (e.g. a light transmissive diffusing material or a light transmissive engineered diffuser) and covered with a coating of reflective material at an exterior surface. Another example of a diffusive light scattering surface is a reflective coating provided on a rough surface.

The diffusive light scattering surface may comprise lenticular lenses or diffraction grating structures. Lenticular lens structures may be incorporated into a film. The diffusive light scattering surface may comprise various periodical structures, such as sinusoidal corrugations provided onto internal surfaces and/or external surfaces. The period length may be in the range of between 0.1 mm-1 mm. The periodical structure can be aligned to achieve scattering in the desired direction.

Hence, as described, the diffusive light scattering surface may comprise; white- or colored paint, white- or colored paper, Spectralon, a light transmissive diffusing material covered by a reflective material, diffusive polymer or metal, an engineered diffuser, a reflective semi-random microstructure, in-molded air pockets or film of diffusive material, different engineered films including e.g. lenticular lenses, or other micro lens structures or grating structures. The diffusive light scattering surface preferably has low NIR absorption.

In a variation of any of the above embodiments wherein the diffusive light scattering element provides a reflector surface, the diffusive light scattering element may be provided with no or insignificant specular component. This may be achieved by using either a matte diffuser film in air, an internal reflective bulk diffusor or a bulk transmissive diffusor. This allows effective scanline broadening by avoiding the narrow, super-imposed specular scanline usually resulting from a diffusor interface having a specular component, and providing only a broad, diffused scanline profile. By removing the super-imposed specular scanline from the touch signal, the system can more easily use the broad, diffused scanline profile. Preferably, the diffusive light scattering surface has a specular component of less than 1%, and even more preferably, less than 0.1%. Alternatively, where the specular component is greater than 0.1%, the diffusive light scattering element is preferably configured with surface roughness to reduce glossiness, e.g. micro structured.

The panel 101 may be made of glass, poly(methyl methacrylate) (PMMA) or polycarbonates (PC). The panel 101 may be designed to be overlaid on or integrated into a display device or monitor (not shown). It is conceivable that the panel 101 does not need to be light transmissive, i.e. in case the output of the touch does not need to be presented through panel 101, via the mentioned display device, but instead displayed on another external display or communicated to any other device, processor, memory etc. The panel 101 may be provided with a shielding layer such as a print, i.e. a cover with an ink, to block unwanted ambient light. The amount of stray light and ambient light that reaches the detectors 106 may thus be reduced.

As used herein, the emitters 105 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 105 may also be formed by the end of an optical fiber. The emitters 105 may generate light in any wavelength range. The following examples presume that the light is generated in the infrared (IR), i.e. at wavelengths above about 750 nm. Analogously, the detectors 106 may be any device capable of converting light (in the same wavelength range) into an electrical signal, such as a photo-detector, a CCD device, a CMOS device, etc.

With respect to the discussion above, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffuse reflection is also known as "scattering". The described examples refer primarily to aforementioned elements in relation to the emitters 105, to make the presentation clear, although it should be understood that the corresponding arrangements may also apply to the detectors 106.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, across a panel and detecting, at a number of detectors, a change in the received light caused by an interaction with the transmitted light at the point of touch.

What is claimed is:

1. A touch sensing apparatus comprising:
a panel that defines a touch surface extending in a plane having a normal axis,
a plurality of emitters and detectors arranged along a perimeter of the panel, and
a light directing portion arranged adjacent the perimeter and comprising a light directing surface,
wherein the emitters are arranged to emit light and the light directing surface is arranged to receive the light and direct the light across the touch surface,
wherein the panel comprises a rear surface, opposite the touch surface, and the plurality of emitters that are configured to emit light and/or the plurality of detectors that are configured to receive light through a channel in a frame element formed from a metal are arranged opposite the rear surface, the channel is arranged opposite the rear surface and extends in a direction of the normal axis,
wherein the light directing surface and the channel are arranged on opposite sides of the panel and overlap in the direction of the plane, and
whereby the light directing surface receives light from the emitters, or directs light to the plurality of detectors, through the panel and through the channel, in the direction of the normal axis, wherein the light directing surface is a metal surface of the frame element,
wherein the light directing portion comprises an outer surface opposite the light directing surface, wherein the light directing surface has a higher reflectance than the outer surface.

2. The touch sensing apparatus according to claim 1, wherein the light directing surface is an anodized metal.

3. The touch sensing apparatus according to claim 2, wherein the frame element is formed from said metal.

4. The touch sensing apparatus according to claim 1, wherein the light directing surface is an etched metal surface, sand blasted metal surface, bead blasted metal surface, or brushed metal surface of the frame element for increasing surface roughness.

5. The touch sensing apparatus according to claim 1, wherein the light directing surface diffusively reflects the light over the touch surface.

6. The touch sensing apparatus according to claim 1, the panel having edges extending between the touch surface and the rear surface,
the channel extending in a direction parallel with the plane with a width ($d_1$) between a first channel wall, arranged closest to a respective edge of the panel, and an opposite second channel wall,
wherein the first channel wall extends with an angle towards the direction of the normal axis.

7. The touch sensing apparatus according to claim 1, wherein the light directing surface extends from an edge portion of the light directing portion being arranged closest to the touch surface to a protrusion of the light directing portion, the protrusion extending in a direction parallel with the plane to shield ambient or stray light from being reflected towards the channel.

8. The touch sensing apparatus according to claim 1, wherein walls of the channel comprise a diffusive light scattering surface.

9. The touch sensing apparatus according to claim 1, wherein the emitters and/or detectors are mounted to a substrate,
wherein a support is attached to the substrate, the support extending in a direction parallel with the plane between the substrate and a frame wall of the frame element.

10. The touch sensing apparatus according to claim 1, wherein the panel having edges extending between the touch surface and the rear surface,
wherein the frame element forms a cavity, and
wherein the plurality of emitters are mounted to a substrate and the substrate is arranged in the cavity so that the plurality of emitters are arranged closer to the respective edge of the panel than the substrate, or wherein the plurality of detectors are mounted to the substrate and the substrate is arranged in the cavity so that the plurality of emitters are arranged closer to the respective edge of the panel than the substrate.

11. The touch sensing apparatus according to claim 10, wherein the cavity extends in a direction parallel with the plane with a width ($d_2$) between a first frame wall, arranged closest to the respective edge of the panel, and an opposite second frame wall,
wherein the substrate is arranged in the cavity so that the emitters and/or detectors are arranged closer to the first frame wall than the substrate.

12. The touch sensing apparatus according to claim 10, wherein the substrate extends with an elongated shape in a direction of the normal axis.

13. The touch sensing apparatus according to claim 1, wherein the metal surface is concave towards the touch surface.

14. The touch sensing apparatus according to claim 1, wherein the light directing surface has a surface roughness defined by a slope RMS ($\Delta q$) between 0.1-0.25.

15. The touch sensing apparatus according to claim 14, wherein the light directing surface has a surface roughness defined by a slope RMS ($\Delta q$) between 0.13-0.20.

16. The touch sensing apparatus according to claim 1, wherein the light directing surface has a surface roughness defined by a slope RMS ($\Delta q$) between 0-0. 1.

17. The touch sensing apparatus according to claim 1, wherein walls of the channel have a higher specular reflectance than the light directing surface.

18. A touch sensing apparatus comprising:
a panel that defines a touch surface extending in a plane having a normal axis,
a plurality of emitters and detectors arranged along a perimeter of the panel,
a light directing portion arranged adjacent the perimeter and comprising a light directing surface,
wherein the plurality of emitters are arranged to emit light and the light directing surface is arranged to receive the light and direct the light across the touch surface, the panel comprises a rear surface, opposite the touch surface,
the plurality of emitters that are configured to emit light and/or the plurality of detectors that are configured to receive light through a channel in a frame element formed from a metal are arranged opposite the rear surface,
the light directing surface receives light from the emitters, or directs light to the plurality of detectors, through the panel and through the channel,
wherein the frame element is formed from a metal and comprises the light directing portion, and the light directing surface is an anodized metal surface of the frame element,
wherein the light directing portion comprises an outer surface opposite the light directing surface, wherein the light directing surface has a higher reflectance than the outer surface.

19. A method of manufacturing a frame element of metal for a touch sensing apparatus, comprising
extruding the frame element to form a light directing portion being a metal surface of the frame element,
milling a wall portion of the frame element to form a channel so that, in use, a light directing surface of the light directing portion receives light from a plurality of emitters, or directs light to a plurality of detectors, through the channel, the light directing portion comprises an outer surface opposite the light directing surface, wherein the light directing surface has a higher reflectance than the outer surface.

20. The method according to claim 19, comprising etching, or bead-blasting, or sand blasting the light directing surface.

21. The method according to claim 20, comprising milling a top portion of the extruded light directing portion so that a height (h) of the light directing portion above a touch surface of a panel, when arranged in the frame element, is reduced.

* * * * *